United States Patent
Hayashi et al.

(10) Patent No.: US 11,580,750 B2
(45) Date of Patent: Feb. 14, 2023

(54) RECORDING APPARATUS, RECORDING METHOD, AND NON-TRANSITORY COMPUTER-READABLE MEDIUM

(71) Applicant: JVCKENWOOD CORPORATION, Yokohama (JP)

(72) Inventors: Keita Hayashi, Yokohama (JP); Toshitaka Murata, Yokohama (JP); Yasutoshi Sakai, Yokohama (JP); Hirofumi Taniyama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 74 days.

(21) Appl. No.: 17/001,242

(22) Filed: Aug. 24, 2020

(65) Prior Publication Data

US 2020/0387721 A1 Dec. 10, 2020

Related U.S. Application Data

(63) Continuation of application No. PCT/JP2019/032314, filed on Aug. 19, 2019.

(30) Foreign Application Priority Data

Nov. 29, 2018 (JP) .............................. JP2018-223263

(51) Int. Cl.
  *B60R 11/04* (2006.01)
  *G06V 20/56* (2022.01)
  *G07C 5/08* (2006.01)
(52) U.S. Cl.
  CPC .............. *G06V 20/56* (2022.01); *B60R 11/04* (2013.01); *G07C 5/0841* (2013.01)

(58) Field of Classification Search
  CPC ... G06K 9/00791; B60R 11/04; G07C 5/0841
  (Continued)

(56) References Cited

U.S. PATENT DOCUMENTS

| | | | | |
|---|---|---|---|---|
| 5,857,059 A | * | 1/1999 | Yamagishi | ........... H04N 1/2112 386/344 |
| 2011/0112719 A1 | * | 5/2011 | Marumoto | ................ G01F 9/02 340/439 |
| 2015/0002674 A1 | * | 1/2015 | Kleve | .................... H04N 7/183 348/149 |

FOREIGN PATENT DOCUMENTS

| | | |
|---|---|---|
| CN | 102067191 A | 5/2011 |
| EP | 2299418 A1 | 3/2011 |

(Continued)

*Primary Examiner* — Ayman A Abaza
(74) *Attorney, Agent, or Firm* — Procopio, Cory, Hargreaves & Savitch LLP

(57) ABSTRACT

A recording apparatus includes: a captured data acquisition unit configured to acquire captured data captured by a camera that captures an image of an outside of a vehicle; an event detection unit configured to detect an event with respect to the vehicle; an attachment/detachment detection unit configured to detect an attachment/detachment state of the recording apparatus with respect to the vehicle; and a recording controller configured to store, when the event detection unit has detected the event, captured data for a predetermined period of time due to the detected event as first event recording data, invalidate, when it is detected by the attachment/detachment detection unit that the recording apparatus has been detached from the vehicle, the detection of the event by the event detection unit after the detection of the detachment, and store captured data after the detection of the detachment as second event recording data.

4 Claims, 8 Drawing Sheets

(58) Field of Classification Search
USPC .......................................................... 348/148
See application file for complete search history.

(56) References Cited

FOREIGN PATENT DOCUMENTS

| | | | | |
|---|---|---|---|---|
| JP | 2018-120497 A | 8/2018 | | |
| KR | 2011-0041626 A | 4/2011 | | |
| KR | 20110041626 A | * | 4/2011 | ............. B62D 41/00 |

\* cited by examiner

RECORDING APPARATUS, RECORDING METHOD, AND NON-TRANSITORY COMPUTER-READABLE MEDIUM

CROSS REFERENCE TO RELATED APPLICATION

This application is a Bypass Continuation of PCT/JP2019/032314 filed on Aug. 19, 2019, which is based upon and claims the benefit of priority from Japanese Patent Application No. 2018-223263, filed on Nov. 29, 2018, the disclosure of which is incorporated herein in its entirety by reference.

BACKGROUND

The present disclosure relates to a recording apparatus, a recording method, and a non-transitory computer-readable medium, and more specifically, to a recording apparatus, a recording method, and a non-transitory computer-readable medium for appropriately storing data in which an accident occurring with regard to a moving body such as an automobile that has been detected is recorded.

Dashboard cameras that detect acceleration occurring due to an impact on a vehicle as an event and store video images for a predetermined period of time before and after the timing when the event has been detected as event recording data in such a way that this data is not overwritten have become widespread. For example, Japanese Unexamined Patent Application Publication No. 2018-120497 discloses a recording apparatus configured to store captured data as event recording data when an event has been detected.

SUMMARY

When the dashboard camera has detected an event occurring due to acceleration or the like, it stores data captured for a predetermined period of time before and after the timing when the event has been detected as event recording data. The behavior of other vehicles after the occurrence of the event, or the behavior, the speech, and the action of passengers of the other vehicles may also be useful information for investigating the accident. However, in dashboard cameras according to related art, it has been difficult to appropriately store the behavior of the other vehicles after the occurrence of the event, or the behavior, the speech, and the action of passengers of the other vehicles.

A recording apparatus according to the present disclosure includes: a captured data acquisition unit configured to acquire captured data captured by a camera that captures an image of an outside of a vehicle; an event detection unit configured to detect an event with respect to the vehicle; an attachment/detachment detection unit configured to detect an attachment/detachment state of the recording apparatus with respect to the vehicle; and a recording controller configured to store, when the event detection unit has detected the event, captured data for a predetermined period of time due to the detected event as first event recording data, invalidate, when it is detected by the attachment/detachment detection unit that the recording apparatus has been detached from the vehicle, the detection of the event by the event detection unit after the detection of the detachment, and store captured data after the detection of the detachment as second event recording data.

A recording method of a recording apparatus according to the present disclosure includes: a captured data acquisition step for acquiring captured data captured by a camera that captures an image of an outside of a vehicle; an event detection step for detecting an event with respect to the vehicle; an attachment/detachment detection step for detecting an attachment/detachment state of the recording apparatus with respect to the vehicle; and a recording control step for storing, when an event has been detected in the event detection step, captured data for a predetermined period of time due to the detected event as first event recording data, invalidating, when it is detected in the attachment/detachment detection step that the recording apparatus has been detached from the vehicle, the detection of the event in the event detection step after the detachment has been detected, and storing captured data after the detection of the detachment as second event recording data.

A non-transitory computer-readable medium storing a program for causing a computer that operates as a recording apparatus according to the present disclosure causes this computer to execute the following steps of: a captured data acquisition step for acquiring captured data captured by a camera that captures an image of an outside of a vehicle; an event detection step for detecting an event with respect to the vehicle; an attachment/detachment detection step for detecting an attachment/detachment state of the recording apparatus with respect to the vehicle; and a recording control step for storing, when an event has been detected in the event detection step, captured data for a predetermined period of time due to the detected event as first event recording data, invalidating, when it is detected in the attachment/detachment detection step that the recording apparatus has been detached from the vehicle, the detection of the event in the event detection step after the detachment has been detected, and storing captured data after the detection of the detachment as second event recording data.

DETAILED DESCRIPTION

In the following description, with reference to the drawings, embodiments of the present disclosure will be described. While the description will be given taking an example of a dashboard camera used in an automobile, which is a vehicle, as an example of a recording apparatus according to the embodiments in the following description, the present disclosure is not limited thereto. The present disclosure can be applied also to, for example, various types of vehicles like motorcycles or automobiles, railroads, ships, robots, and a moving body other than the vehicles, like persons. Further, the present disclosure is not limited by the following embodiments. Further, the recording apparatus according to the present disclosure may be referred to as a recording reproduction apparatus since this recording apparatus is able to reproduce stored event recording data and the like.

Hereinafter, with reference to FIGS. 1 to 4, a first embodiment of the present disclosure will be described. A recording apparatus 10 according to the first embodiment, which is a dashboard camera, is mounted above a windshield 500 of a vehicle in a fixed state in such a manner that the front side of the vehicle can be captured, detects an impact that corresponds to a phenomenon such as an accident that should be detected as an event, and stores captured data during a period including the timing when the accident has occurred as event recording data. The recording apparatus 10 which serves as the dashboard camera is not limited to the one mounted on a vehicle as a single apparatus and may be applicable also to a configuration in which it is provided as a function of a navigation device or a configuration in which it is mounted on a vehicle in advance.

Figure 1:
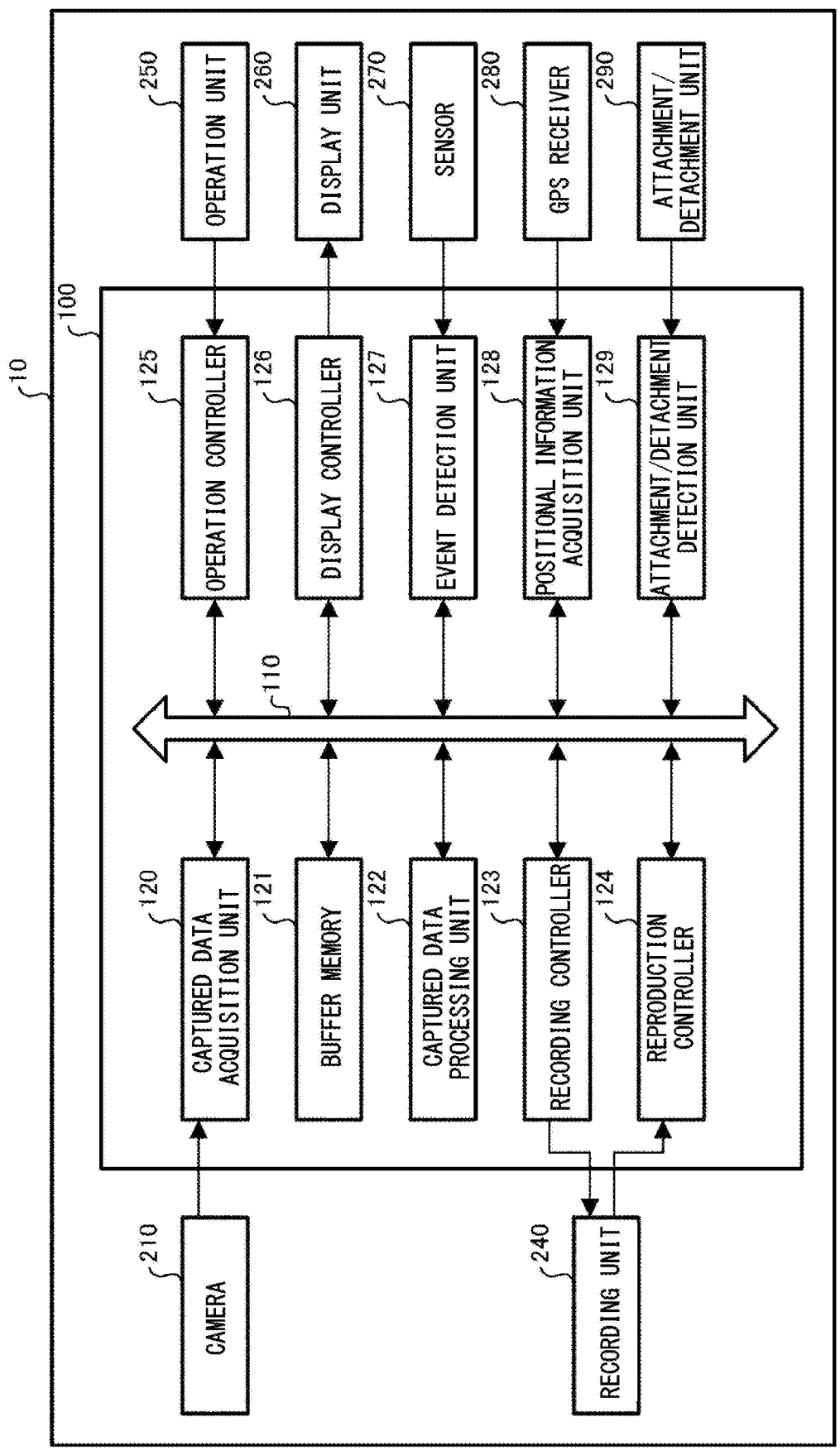
FIG. 1 is a block diagram showing a configuration of a recording apparatus according to a first embodiment of the present disclosure.

FIG. 1 is a block diagram showing a configuration of the recording apparatus 10 in the first embodiment of the present disclosure. In FIG. 1, the recording apparatus 10 includes a controller 100, which is a recording control device, a camera 210, a recording unit 240, an operation unit 250, a display unit 260, a sensor 270, a Global Positioning System (GPS) receiver 280, and an attachment/detachment unit 290.

While the recording apparatus 10 is mounted on the vehicle in such a way that the capturing direction of the camera 210 that captures an outside of the vehicle is directed to the front side of the vehicle, it may be mounted on the vehicle in such a way that the capturing direction of the camera 210 is directed to the back side or the lateral side of the vehicle. Further, the recording apparatus 10 may be an integrated apparatus or may be provided in a plurality of apparatuses in a dispersed manner. Further, while description of a power supply that operates the recording apparatus 10 etc. is omitted in the description in FIG. 1, the recording apparatus 10 operates by power supplied from the vehicle. The recording apparatus 10 includes a battery (not shown) as well, and operates by power supplied from the battery when the recording apparatus 10 is detached from the vehicle and thus the power is not supplied from the vehicle.

Figure 2A:
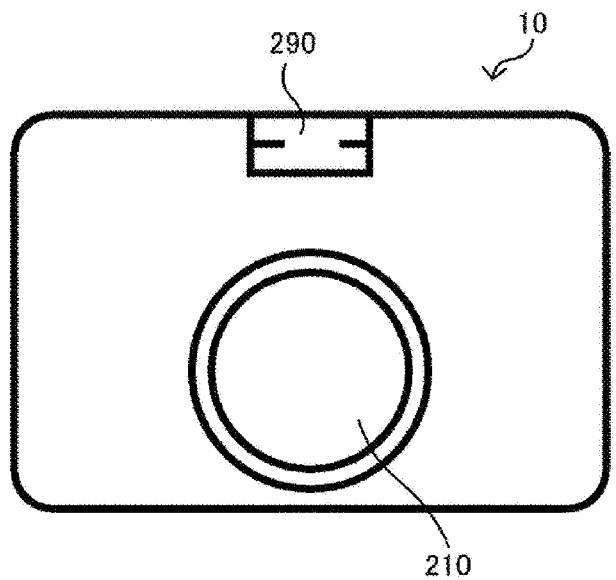
FIG. 2A is a diagram showing the exterior of the recording apparatus according to the first embodiment of the present disclosure.
Figure 2B:
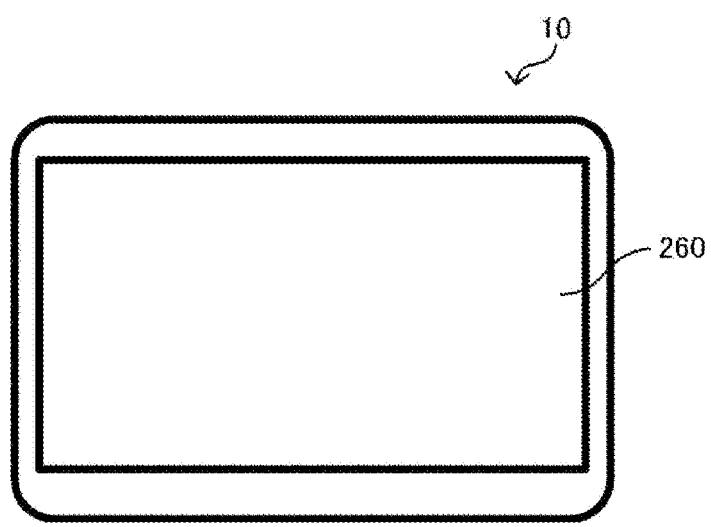
FIG. 2B is a diagram showing the exterior of the recording apparatus according to the first embodiment of the present disclosure.
Figure 2C:
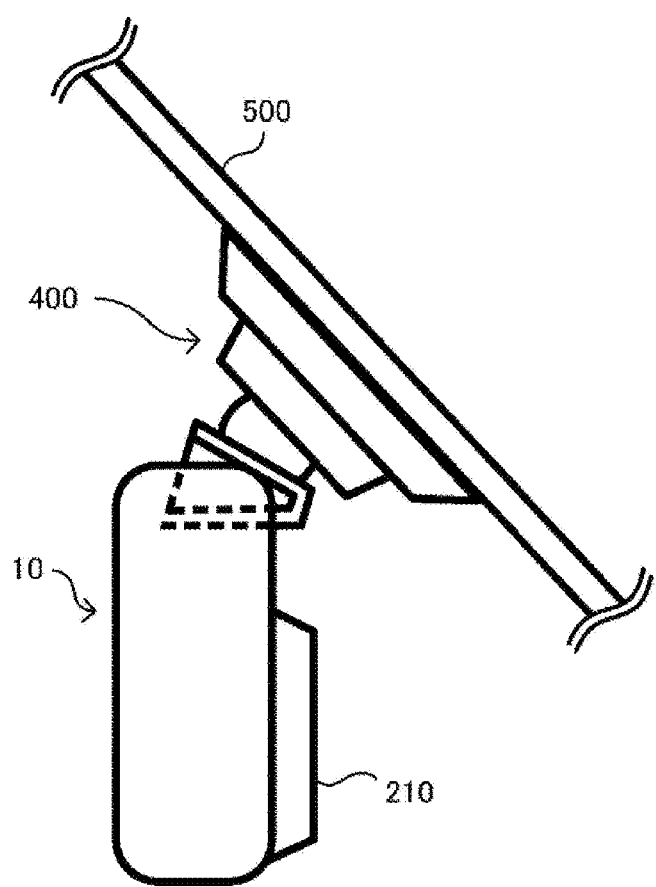
FIG. 2C is a diagram showing the exterior of the recording apparatus according to the first embodiment of the present disclosure.

FIGS. 2A, 2B, and 2C each show the exterior of the recording apparatus 10 in the first embodiment of the present disclosure. FIG. 2A is a front view when the recording apparatus 10 is seen from the direction in which an outside of the vehicle is captured. That is, FIG. 2A is a view when the recording apparatus 10 is seen from the direction in which the camera 210 captures images. FIG. 2B is a view when the recording apparatus 10 is seen from the back surface. FIG. 2C is a view when the recording apparatus 10 is seen from the side surface.

As shown in FIGS. 2A, 2B, and 2C, the recording apparatus 10 includes the camera 210 that captures an image of an outside of the vehicle, the display unit 260 that displays reproduced event recording data or the like, and the attachment/detachment unit 290 that causes the recording apparatus 10 to be mounted on the vehicle in such a way that the recording apparatus 10 can be attached to or detached from the vehicle. As shown in FIG. 2C, the recording apparatus 10 is attached to the windshield 500 or the like included in the vehicle using a bracket 400 or the like. In the example shown in FIG. 2C, the recording apparatus 10 is installed so as to be able to capture images in an area including the front side of the vehicle via the windshield 500. The bracket 400, which includes a suction cup, a ball joint and the like, can be attached to or detached from the attachment/detachment unit 290 of the recording apparatus 10. Therefore, to remove the recording apparatus 10 from the bracket 400 by the attachment/detachment unit 290 is the same as to remove the recording apparatus 10 from the vehicle and to attach the recording apparatus 10 to the bracket 400 by the attachment/detachment unit 290 is the same as to attach the recording apparatus 10 to the vehicle.

When the recording apparatus 10 is mounted above the windshield 500 of the vehicle in such a way that it is directed to the front side of the vehicle so as to capture images on the front side of the vehicle, the camera 210 can capture images on the front side, which is an outside of the vehicle, via the windshield 500 of the vehicle, and the display surface of the display unit 260 is directed toward the cabin of the vehicle, in other words, toward the driver.

With reference once again to FIG. 1, the controller 100 is formed of one or a plurality of Central Processing Units (CPUs), Graphics Processing Units (GPUs), buffer memories 121 etc. that perform various kinds of data processing, and executes various kinds of processing by programs. The controller 100 at least includes, as its components and functions, a bus line 110, a captured data acquisition unit 120, a captured data processing unit 122, a recording controller 123, a reproduction controller 124, an operation controller 125, a display controller 126, an event detection unit 127, a positional information acquisition unit 128, and an attachment/detachment detection unit 129. In the following description, the components of the controller 100 are described to be the ones that exchange data such as captured data via the bus line 110.

The controller 100, which is a recording control device that executes operations according to the present disclosure in the recording apparatus 10, executes a recording method according to the present disclosure. Further, the controller 100 is a computer that operates a program according to the present disclosure.

The camera 210 captures images of an outside of the vehicle, which is a moving body. The camera 210 is preferably integrated with the recording apparatus 10. The camera 210 includes a lens, an image-pickup element, an Analog to Digital (A-D) conversion element and the like, although they are not shown in the drawings. The camera 210 outputs the captured data that has been captured to the captured data acquisition unit 120. The area captured by the camera 210 is a desired area such as the front side or the back side of the vehicle, and the camera 210 may be an omni-directional camera.

While only one camera 210 is provided in FIG. 1, the camera 210 may be formed of a plurality of cameras. The camera 210 may be, for example, a plurality of cameras of a desired combination of cameras that capture respective images of the front side, the back side, the lateral side, and inside the cabin of the vehicle. Further, the camera 210 may be the one that captures an omni-directional area.

The data captured by the camera 210 is video data, which is moving images. The captured data may include, besides video data, voice data. In this case, the components of the camera 210 include a microphone.

The recording unit, which is a non-volatile memory for recording various kinds of captured data captured by the camera 210 by control performed by the recording controller 123, is, for example, a memory card. The captured data recorded in the recording unit 240 is reproduced by control of the reproduction controller 124. The recording unit 240 may be replaced by a separate apparatus including the recording controller 123 and the reproduction controller 124 in addition to the recording unit 240. The recording unit 240 may be integrated with the recording apparatus 10 or may be connected thereto as a separate component by a wire or wirelessly.

The operation unit 250, which is an interface that accepts an operation on the recording apparatus 10, outputs information on the accepted operation to the operation controller 125. The operation unit 250, which is various kinds of buttons or a touch panel, accepts an operation by the user. The operation unit 250 may accept an operation by another apparatus connected thereto wirelessly. The operation unit 250 accepts, for example, a user's operation of starting recording of an event. Further, the operation unit 250 accepts a user's operation of performing selection and reproduction of the event recording data.

The display unit 260 is a display device that displays various kinds of information by the control performed by the display controller 126. The display unit 260 includes, for example, a display panel such as a liquid crystal panel or an organic EL panel. The display unit 260 may be integrated with the recording apparatus 10 or may be connected thereto as a separate component by a wire or wirelessly. The display unit 260 may be another device that is connected wirelessly and includes the display controller 126.

The sensor 270, which is, for example, an acceleration sensor, detects acceleration applied to the recording apparatus 10 or the vehicle. The sensor 270, which is, for example, a three-axis acceleration sensor, detects acceleration applied in the front-back direction of the vehicle as the x-axis direction, the right-left direction of the vehicle as the y-axis direction, and the vertical direction of the vehicle as the z-axis direction. The sensor 270 outputs the information on the detected acceleration to the event detection unit 127. The sensor 270 is integrated with the recording apparatus 10.

The GPS receiver 280 is a GPS antenna that receives signals from a GPS satellite. The GPS receiver 280 outputs the received signals to the positional information acquisition unit 128. The GPS receiver 280 may be integrated with the recording apparatus 10 or may be connected thereto as a separate component by a wire or wirelessly. Further, the GPS receiver 280 may be a separate component as another apparatus including the positional information acquisition unit 128. Various positioning systems other than GPS can be applied as the GPS receiver 280.

The attachment/detachment unit 290 is a component to attach the recording apparatus 10 to the vehicle. For example, as shown in FIGS. 2A, 2B, and 2C, a part of the bracket 400 is engaged with the attachment/detachment unit 290, whereby the recording apparatus 10 is mounted on the vehicle in such a way that it can be attached to or detached from the vehicle. The attachment/detachment unit 290 is configured in such a way that the attachment/detachment detection unit 129 can determine that the recording apparatus 10 has been detached from the vehicle. When, for example, the recording apparatus 10 is attached to the vehicle, the state of an element that is elastically engaged with a part of the bracket 400 that is engaged with the attachment/detachment unit 290 may be mechanically or electrically detected. Alternatively, when the recording apparatus 10 is configured in such a way that it is supplied with power from the vehicle via the attachment/detachment unit since an electrode part included in the bracket 400 contacts an electrode part included in the attachment/detachment unit 290 at a time of engagement of the bracket 400 with the attachment/detachment unit 290, the attachment/detachment detection unit 290 may be configured to be able to determine the attachment/detachment state depending on the state of the power supply from the vehicle.

The captured data acquisition unit 120 acquires the captured data captured by the camera 210. The captured data acquisition unit 120 outputs the captured data acquired from the camera 210 to the buffer memory 121.

The buffer memory 121, which is an internal memory included in the controller 100, temporarily stores captured data for a certain period of time acquired by the captured data acquisition unit 120 while updating this captured data.

The captured data processing unit 122 converts captured data that the buffer memory 121 temporarily stores into, for example, a desired file format such as MP4 format, which is encoded by a codec having a desired system such as H.264 or MPEG-4 (Moving Picture Experts Group). The captured data processing unit 122 generates captured data generated as a file for a certain period of time from the captured data that the buffer memory 121 temporarily stores. As a specific example, the captured data processing unit 122 generates captured data that the buffer memory 121 temporarily stores in the order of recording. The captured data generated here has a length of 60 seconds as one file. The captured data processing unit 122 outputs the generated captured data to the recording controller 123. Further, the captured data processing unit 122 outputs the generated captured data to the display controller 126. While the period of the captured data generated as one file is set to be 60 seconds as one example, this is merely one example.

The recording controller 123 performs control to cause the recording unit 240 to record the captured data filed by the captured data processing unit 122. In the period during which the event detection unit 127 has not detected an event, the recording controller 123 records the captured data filed by the captured data processing unit 122 in the recording unit 240 as the captured data that can be overwritten. When the recording capacity of the recording unit 240 has reached the upper limit, the recording controller 123 overwrites the overwritable captured data recorded in the recording unit 240 with new captured data from a recording area where old captured data is recorded. This recording is called loop recording.

While it is determined in the event detection unit 127 that an event has occurred, the recording controller 123 stores the captured data for a predetermined period of time due to the detection of the event in the recording unit 240 as first event recording data where overwriting is prohibited.

A desired method may be performed as the method of storing the event recording data by the recording controller 123. For example, a write-protected flag is added to a header or a payload of a section in which overwriting is prohibited in the captured data, and the captured data is stored in the recording unit 240. Alternatively, the section in which overwriting is prohibited in the captured data is stored in the write-protected area of the recording unit 240. Alternatively, the section in which overwriting is prohibited in the captured data is transmitted to another apparatus, where the captured data is stored.

When the event detection unit 127 has detected an event, the recording controller 123 stores at least captured data for a predetermined period of time before and after the detection of the event as the first event recording data. The predetermined period of time before and after the detection of the event is, for example, 30 seconds before the detection of the event and 30 seconds after the detection of the event. The recording controller 123 stores, when the loop recording is not performed during the period in which an event has not been detected, the captured data for a predetermined period of time after the detection of the event as the first event recording data.

The recording controller 123 invalidates, when the attachment/detachment detection unit 129 has detected that the recording apparatus 10 has been detached from the vehicle, the detection of the event by the event detection unit after the detachment of the recording apparatus 10 is detected and stores captured data after the detection of the detachment in the recording unit 240 as second event recording data.

The recording controller 123 invalidates, when the attachment/detachment detection unit 129 has detected that the recording apparatus 10 has been detached from the vehicle within a first period after the detection of the event by the event detection unit 127, detection of the event by the event detection unit 127, and stores the captured data after the detection of the detachment in the recording unit 240 as the second event recording data.

When the attachment/detachment detection unit 129 has detected that the recording apparatus 10 has been detached from the vehicle within a second period after the storage of the first event recording data, the recording controller 123 invalidates the detection of the event by the event detection unit 127 and stores the captured data that the captured data acquisition unit 120 has acquired after it has been detected that the recording apparatus 10 has been detached from the vehicle as the second event recording data.

The reproduction controller 124 performs control for reproducing various kinds of captured data recorded in the recording unit 240. The reproduction controller 124 reproduces, besides the overwritable captured data that has been recorded in the recording unit 240, the event recording data where overwriting is prohibited, and outputs the reproduced data to the display controller 126.

The operation controller 125 acquires operation information that the operation unit 250 has accepted and outputs the operation instruction based on the operation information to each of the components. When the operation controller 125 has acquired an instruction for selecting various kinds of data, which are to be reproduced, from the operation unit 250, the operation controller 125 causes the reproduction controller 124 to select the file and the like recorded in the recording unit 240. When the operation controller 125 has acquired an instruction regarding reproduction of various kinds of data from the operation unit 250, the operation controller 125 causes the reproduction controller 124 to perform processing regarding reproduction of the various kinds of data. The instruction regarding reproduction of various kinds of data includes, for example, reproduction start, pause, reproduction stop, enlarged display, etc.

The display controller 126 performs control for causing the display unit 260 to display various kinds of information. The display controller 126 causes the display unit 260 to display, for example, video data which is being captured by the camera 210. Further, the display controller 126 causes the display unit 260 to display the event recording data that is stored in the recording unit 240 and is reproduced by the reproduction controller 124. Further, when the display unit 260 includes a touch panel function as the operation unit 250, the display controller 126 causes the display unit 260 to display an icon or the like for performing a touch operation.

The event detection unit 127 acquires information on the acceleration detected by the sensor 270, which is an acceleration sensor, and determines that an event has been detected when acceleration that corresponds to an event has been detected. When the event detection unit 127 has determined that the event has been detected, the event detection unit 127 outputs information indicating that the event has been detected to the recording controller 123.

The event detection unit 127 determines whether the acceleration output from the sensor 270 corresponds to acceleration when a vehicle has collided with another object such as another vehicle and detects that the acceleration output from the sensor 270 as acceleration that corresponds to an event when it corresponds to the acceleration when the vehicle has collided with the other object such as the other vehicle. The detection of the acceleration that corresponds to an event may be weighted in each of the x-axis direction, the y-axis direction, and the z-axis direction. Further, acceleration that sharply rises may be detected as the detection of the acceleration that corresponds to the event.

The positional information acquisition unit 128 specifies, based on signals from a GPS satellite that the GPS receiver 280 has received, the current position for each time, and outputs the current positional information for each time to the recording controller 123. The positional information acquisition unit 128 specifies the latitude and the longitude as the current positional information. The positional information acquisition unit 128 may receive, besides signals from the GPS receiver 280, radio waves such as Wi-Fi (registered trademark) and specify the current position using positional information of an access point as well.

The attachment/detachment detection unit 129 detects the attachment/detachment state of the recording apparatus 10 with respect to the vehicle and outputs a signal indicating the attachment/detachment state of the recording apparatus 10 or a signal indicating that the recording apparatus 10 has been detached from the recording controller 123.

Figure 3:
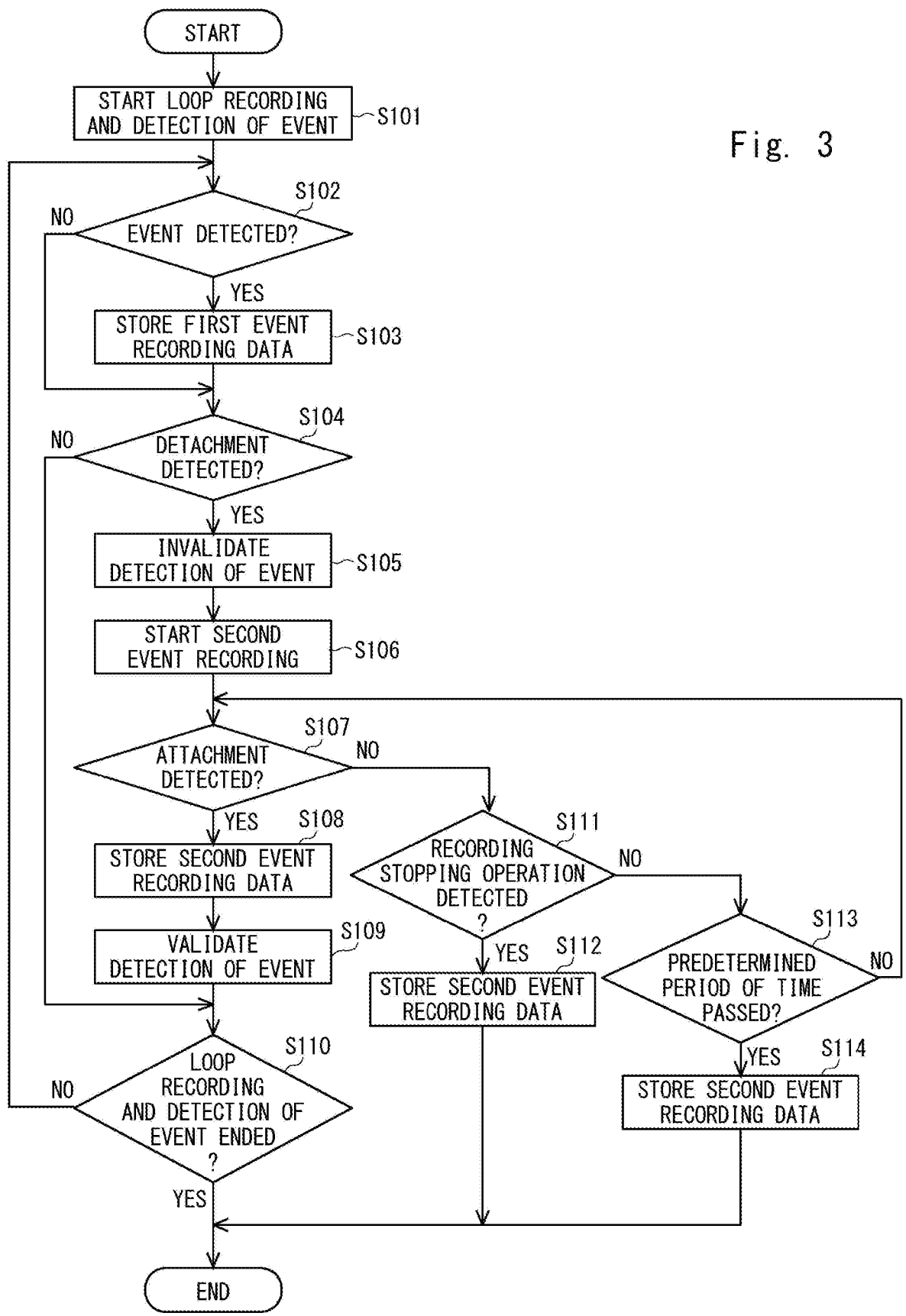
FIG. 3 is a flowchart showing a processing example of the recording apparatus according to the first embodiment of the present disclosure.
Figure 4:
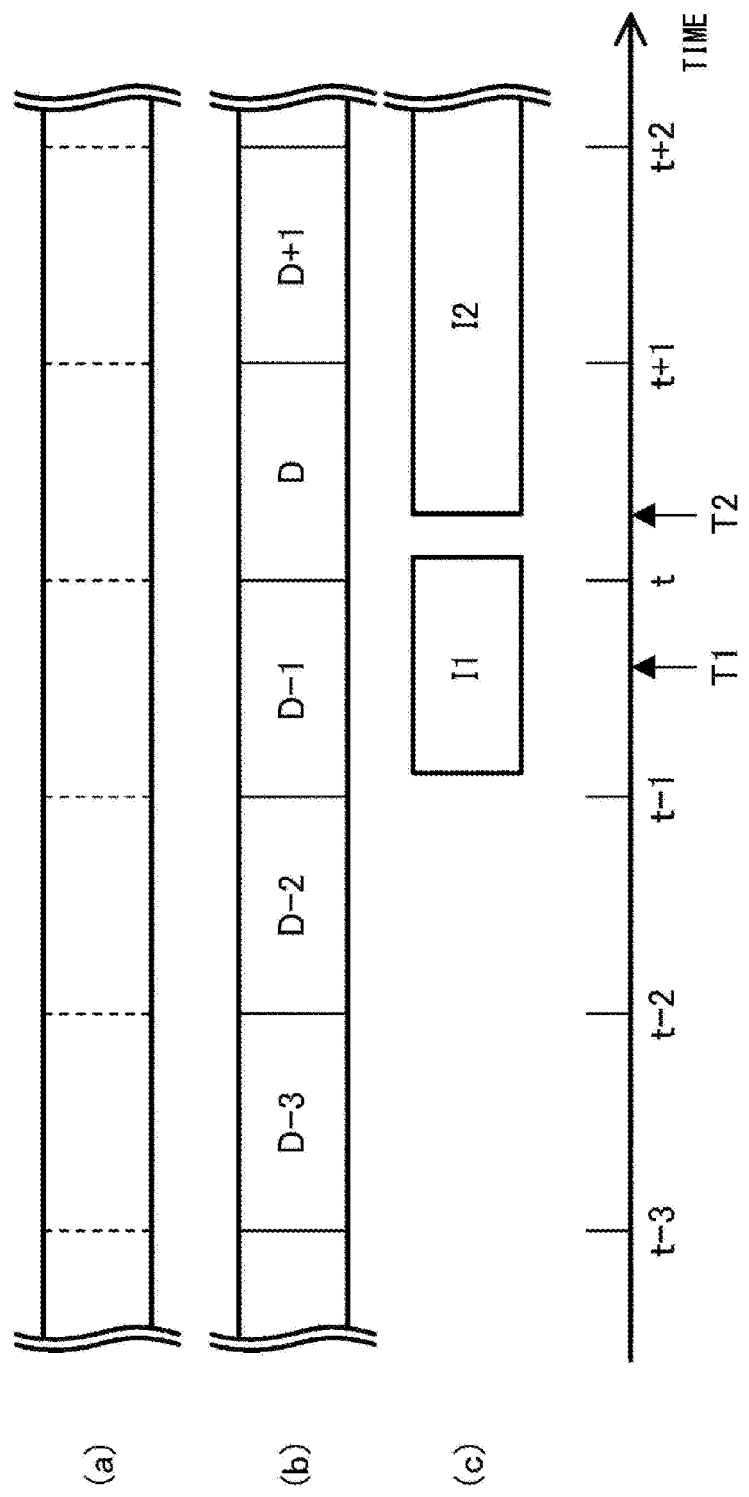
FIG. 4 is a diagram conceptually showing a relation between captured data and event recording data according to the first embodiment of the present disclosure.

Referring next to FIGS. 3 and 4, a processing example of the recording apparatus 10 according to the present disclosure will be described. A recording method executed by the recording apparatus 10 illustrated in FIG. 3 is executed by the controller 100, which is a computer that operates the recording apparatus 10, based on a program. The functions of the controller 100 may be executed by control apparatuses included in a plurality of apparatuses or a plurality of units in a dispersed manner. In this case, the program can also be executed in a cooperative manner for each apparatus or each unit.

The processing shown in FIG. 3 is initiated by the start of the operation of the recording apparatus 10. The start of the operation of the recording apparatus 10 includes, besides a situation in which the recording apparatus 10 starts the operation as the vehicle starts the operation, a situation in which the recording apparatus 10 starts the operation as a parking monitoring function as the vehicle is parked, and is not limited to the start and the end of a specific phenomenon. In the following description, a case in which the processing shown in FIG. 3 is started since the vehicle starts the operation and the processing shown in FIG. 3 is ended since the vehicle ends the operation will be described.

In the recording apparatus 10, when the vehicle starts the operation, the power is supplied from the accessary power supply of the vehicle to the recording apparatus 10, whereby the processing shown in FIG. 3 is started. The recording apparatus 10 may charge the battery included in the recording apparatus 10 while power is being supplied from the vehicle. After the processing is started, the recording apparatus 10 starts the loop recording by the recording controller 123 and the detection of the event by the event detection unit 127 (Step S101).

While the loop recording and the detection of the event in Step S101 are being continued, the event detection unit 127 acquires the output of the sensor 270 and determines whether or not an event has been detected (Step S102). The event detection unit 127 determines that the event has been detected when the acceleration detected by the sensor 270 is, for example, acceleration that corresponds to an accident such as a collision of an object with the vehicle. The acceleration that corresponds to a collision of an object with the vehicle may include a case in which the absolute value of the acceleration is equal to or larger than a predetermined threshold or a case in which the absolute value of the acceleration is equal to or larger than a predetermined threshold and the rising of this acceleration is sharp in a predetermined manner. Further, the event detection unit 127 may determine that an event has been detected when acceleration detected as an abnormal value such as sudden braking has been detected although the detected acceleration does not correspond to a collision of an object with the vehicle.

When it is determined in Step S102 that the event has been detected (Step S102: Yes), the recording controller 123 stores the first event recording data based on the captured data that is loop recorded (Step S103). Specifically, the captured data for a predetermined period of time before and after the detection of the event is stored in the recording unit 240 as the first event recording data which is write-protected data. Further, when it is determined in Step S102 that the event has not been detected (Step S102: No), the process proceeds to Step S104.

Referring next to FIG. 4, the relation between the captured data and the first event recording data will be described. FIG. 4 is a diagram conceptually showing the relation between the captured data and the first event recording data. The horizontal axis of FIG. 4 indicates the passage of time and indicates that the time passes toward the right direction.

FIG. 4(a) shows the captured data acquired from the camera 210 by the captured data acquisition unit 120 and temporarily stored in the buffer memory 121. The dotted lines in FIG. 4(a) correspond to time t−3 to time t+2 described in the time axis, and each indicate the period for the captured data processing unit 122 to generate a file. Since a file has not yet been generated in the state in which the captured data shown in FIG. 4(a) is temporarily stored in the buffer memory 121, the time is shown by the dotted lines.

FIG. 4(b) indicates the captured data obtained by filing, by the captured data processing unit 122, the captured data temporarily stored in the buffer memory 121, and recorded, by the recording controller 123, in the recording unit 240. For example, the captured data D-3, which is data captured between time t−3 and time t−2, is filed and recorded in the recording unit 240 in a state in which it can be overwritten. Further, the captured data D-2, which is also data captured between time t−2 and time t−1, is filed and recorded in the recording unit 240 in a state in which it can be overwritten.

When, for example, the recording capacity of the recording unit 240 has reached the upper limit, the captured data shown in FIG. 4(b) is overwritten from the file with the oldest recorded time.

When, for example, an event has been detected at time T1, which is between time t−1 and time t, the captured data in the period from a predetermined period of time before time T1, which is the event occurrence time, to a predetermined period of time after time T1 is stored as first event recording data I1. The predetermined period of time is, for example, but not limited to, a period from 30 seconds before time T1, which is the event occurrence time, to 30 seconds after time T1.

As another example of the first event recording data, when an event has been detected at time T1, which is between time t−1 to time t, the recording controller 123 stores the captured data D-1 in the write-protected area of the recording unit 240 as first event recording data D-1' (not shown).

When, for example, the recording capacity of the recording unit 240 has reached the upper limit, the captured data shown in FIG. 4(b) is overwritten in the order of recording, whereas the first event recording data is definitely stored in the write-protected area of the recording unit 240 shown in FIG. 4(c) since it is stored therein as the first event recording data I1.

Each of the captured data and the first event recording data is preferably recorded in association with positional information acquired by the positional information acquisition unit 128 and the acceleration information acquired by the event detection unit 127.

With reference once again to FIG. 3, after the first event recording data is stored in Step S103, the attachment/detachment detection unit 129 detects whether or not the recording apparatus 10 has been detached from the vehicle (Step S104). In effect, while the recording apparatus 10 is being operated, the attachment/detachment detection unit 129 detects the attachment/detachment state of the recording apparatus 10 with respect to the vehicle regardless of whether the event is detected. The processing in Step S104 shows an example in which the recording apparatus 10 is detached from the vehicle after the first event recording data is stored, that is, after the storage of the first event recording data is completed.

When it is detected in Step S104 that the recording apparatus 10 has been detached from the vehicle (Step S104: Yes), the event detection unit 127 invalidates the detection of an event (Step S105). In the processing of invalidating the detection of the event in Step S105, even when the acceleration acquired from the sensor 270 is the acceleration that corresponds to an event, for example, the event detection unit 127 does not output the information indicating that the event has been detected to the recording controller 123. As another example, the event detection unit 127 may stop processing of detecting an event. When it is not detected in Step S104 that the recording apparatus 10 has been detached from the vehicle (Step S104: No), the process proceeds to Step S110.

The recording controller 123 starts the second event recording at the same time as the processing shown in Step S105 or after the processing shown in Step S105 (Step S106). The second event recording means an operation in which recording of the second event recording data where overwriting is prohibited is started, like the first event recording data, since the recording apparatus 10 is detached from the vehicle after the first event recording is performed or in the period in which an event has not been detected.

In FIG. 4, at time T2, it is detected that the recording apparatus 10 has been detached from the vehicle and the storage of second event recording data I2 is started.

After the second event recording has been started in Step S106, the recording controller 123 detects whether or not the recording apparatus 10 has been attached to the vehicle (Step S107). Specifically, the recording controller 123 determines whether or not a signal indicating that the attachment/detachment detection unit 129 has detected that the recording apparatus 10 has been attached to the vehicle using the attachment/detachment unit 290 has been acquired.

When it is detected in Step S107 that the recording apparatus 10 has been attached to the vehicle (Step S107: Yes), the recording controller 123 stops the second event recording and stores the second event recording data generated here as write-protected data (Step S108). The second event recording data generated in this case is captured data in the period from the detection that the recording apparatus 10 has been detached from the vehicle to the detection that it has been attached to the vehicle.

After the second event recording data is stored in Step S108 or at the same time as Step S108, the recording controller 123 validates the detection of the event by the event detection unit 127 (Step S109). The processing of validating the detection of the event in Step S109 is, for example, the processing of outputting, by the event detection unit 127, information indicating that the event has been detected to the recording controller 123 when the acceleration acquired from the sensor 270 is acceleration that corresponds to an event. In another example, the event detection unit 127 may start processing of detecting the event. Further, the processing in Step S109 may be performed when the attachment/detachment detection unit 129 detects that the recording apparatus 10 has been attached to the vehicle using the attachment/detachment unit 290 in Step S107.

After the detection of the event has been validated in Step S109, the recording apparatus 10 determines whether or not the loop recording by the recording controller 123 and the detection of the event by the event detection unit 127 have been ended (Step S110). It can be determined that the loop recording by the recording controller 123 and the detection of the event by the event detection unit 127 have been ended when the operation of the recording apparatus 10 is ended since the operation unit 250 is operated or when the supply of the power from the accessory power supply of the vehicle to the recording apparatus 10 is stopped.

When it is determined in Step S110 that the loop recording and the detection of the event have not been ended (Step S110: No), the process proceeds to Step S102. On the other hand, when it is determined that the loop recording and the detection of the event have been ended (Step S110: Yes), this processing is ended.

When it is not detected in Step S107 that the recording apparatus 10 has been attached to the vehicle (Step S107: No), the recording controller 123 determines whether or not the recording stopping operation has been detected (Step S111). Specifically, the recording controller 123 determines whether or not it has acquired a signal indicating stop of the recording from the operation controller 125 since an operation that corresponds to the stop of the recording has been performed on the operation unit 250.

When it is determined in Step S111 that the recording stopping operation has been detected (Step S111: Yes), the recording controller 123 stops the second event recording and stores the second event recording data generated here as write-protected data (Step S112). The second event recording data generated in this case is captured data in the period from the detection of the detachment of the recording apparatus 10 from the vehicle to the detection of the recording stopping operation. When it is determined in Step S111 that the recording stopping operation has not been detected (Step S111: No), the recording controller 123 determines whether or not the predetermined period of time has passed after the second event recording has been started in Step S106 (Step S113). The predetermined period of time in this case is, for example, three minutes or five minutes, and may be set in advance.

When it is determined in Step S113 that the predetermined period of time has passed (Step S113: Yes), the recording controller 123 stops the second event recording and stores the second event recording data that has been generated here as write-protected data (Step S114). The second event recording data generated in this case is the captured data for a predetermined period time after the detection that the recording apparatus 10 has been detached from the vehicle. When it is determined in Step S113 that the predetermined period of time has not passed (Step S113: No), the process proceeds to Step S107. When the second event data is stored in a state in which the recording apparatus 10 has not attached to the vehicle in Step S112 or S114, this processing is ended. Even in the case in which the processing shown in FIG. 3 is ended in the state in which the recording apparatus has not been attached to the vehicle in Step S112 or S114, the detection of the event may be validated since it is detected that the recording apparatus has been attached to the vehicle, and the loop recording and the detection of the event may be started.

As shown in FIG. 4, like the first event recording data, the second event recording data is stored in the write-protected area of the recording unit 240 shown in FIG. 4(c) as the event recording data I2.

In the processing from Step S103 to Steps S108, S112, and S114, for example, after an event such as an accident has occurred and the first event recording data has been stored, the recording apparatus 10 can be detached from the vehicle, and the state of this vehicle after the occurrence of the event, a surrounding state such as the state of other vehicles, the reaction made by persons involved in the event, the behavior, the speech, and the action of passengers of the other vehicles as the second event recording data. In general, the recording apparatus 10 that serves as the dashboard camera is fixed to the vehicle, and thus the area that can be captured is limited. Therefore, after the occurrence of an event such as an accident, the storage of the second event recording data is initiated by the detachment of the recording apparatus 10 from the vehicle, whereby it is possible to record the situation after the occurrence of the event in a desired capturing direction and a desired capturing position. Further, the detection of the event is invalidated when the recording apparatus 10 is detached from the vehicle, whereby it is possible to prevent a situation in which a vibration that occurs when the detached recording apparatus 10 is carried is detected as an event and to store the second event recording data for a necessary period, not a predetermined period like in the first event recording data.

In the processing in Step S107, for example, the recording apparatus 10 is detached from the vehicle in a desired timing when an event has not been detected, whereby it is possible to store the situation and the like of an accident in which the user of this vehicle is not involved as the second event recording data. In general, since the recording apparatus 10 which serves as a dashboard camera is fixed to the vehicle, the area that can be captured is limited. Therefore, since the storage of the second event recording data is initiated by the detachment of the recording apparatus 10 from the vehicle, it is possible to record various kinds of captured data in a desired capturing direction and a desired capturing position. Further, the detection of the event is invalidated when the recording apparatus 10 is detached from the vehicle, whereby it is possible to prevent a vibration that occurs when the detached recording apparatus 10 is carried from being detected as an event and to store the second event recording data for a necessary period.

The aforementioned second event recording data is captured data obtained by capturing the situation after the occurrence of the event, which is different from captured data such as the first event recording data captured at the timing when the event has been detected by the event detection unit 127. Therefore, unlike the first event recording data, it is difficult to specify the period in which the second event recording data is stored as the event recording data. Further, in the state in which the recording apparatus 10 is fixed to the vehicle, it is difficult to appropriately capture the situation after the occurrence of the event.

Accordingly, when it is detected that the recording apparatus 10 has been detached from the vehicle after the detection of the event, the detection of the event is invalidated, whereby it becomes possible to captured data for a desired period as the second event recording data. Further, by storing the captured data after it is detected that the recording apparatus 10 has been detached from the vehicle after the detection of the event as the second event recording data, it becomes possible to capture the situation after the occurrence of the event without performing complicated operations.

While the time during which the second event recording data is recorded can be arbitrarily determined by the user, it tends to be longer than the time during which the first event recording data is recorded. Therefore, the recording controller 123 may cause the first event recording data to be stored in the write-protected area of the recording unit 240 and cause the second event recording data to be stored by adding a write-protected flag to the captured data.

Next, other conditions of Step S104 in FIG. 3 will be described. In the processing in Step S104, the second event recording processing may be performed when it is detected that the recording apparatus 10 has been detached from the vehicle within a predetermined first period after the detection of the event detected in Step S102 (Step S104: Yes). The first period in this case is, for example, three minutes or five minutes, during which it is possible to perform capturing related to an event regarding which captured data is stored clearly as the first event recording data and store the captured data as the second event recording data.

It is possible, for example, that the recording apparatus 10 may be detached from the vehicle in the period in which the captured data stored as the first event recording data is being captured. In this case, the captured data after the first event recording data is stored may be stored as the second event recording data.

Further, in the processing in Step S104, when it is detected that the recording apparatus 10 has been detached from the vehicle within a predetermined second period after the first event recording data is stored in Step S103 (Step S104: Yes), the second event recording processing may be performed. The second period in this case is, for example, three minutes or five minutes, during which it is possible to perform capturing related to an event regarding which captured data is stored clearly as the first event recording data and store the captured data as the second event recording data.

Figure 5:
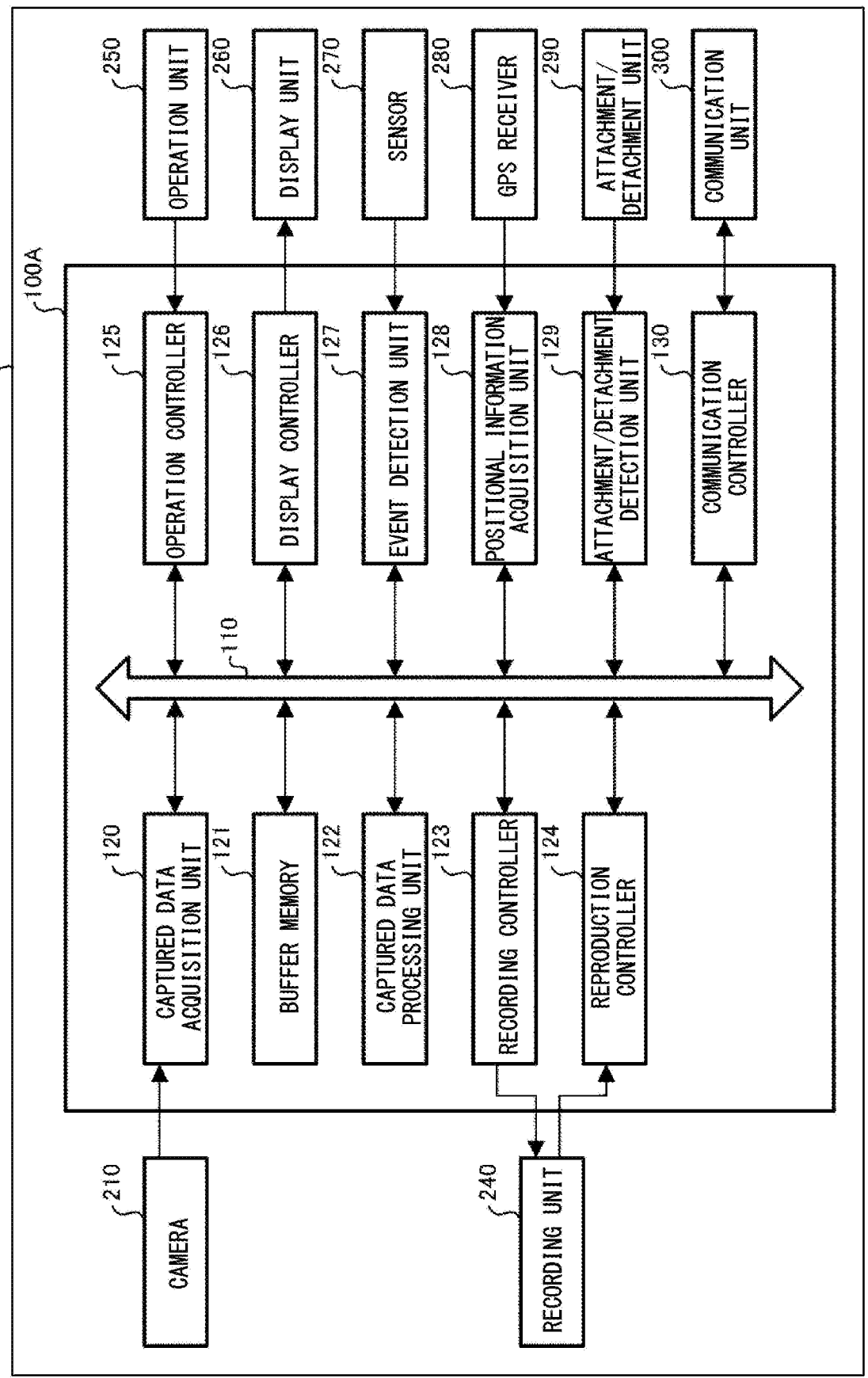
FIG. 5 is a block diagram showing a configuration of a recording apparatus according to a second embodiment of the present disclosure.

Referring next to FIG. 5, a second embodiment of the present disclosure will be described. In the description of the second embodiment, the description that is common to the first embodiment will be omitted. FIG. 5 is a block diagram showing a configuration of a recording apparatus 10A according to the second embodiment of the present disclosure. The recording apparatus 10A further includes a communication controller 130 and a communication unit 300 besides the components of the recording apparatus 10 in the first embodiment of the present disclosure.

The communication unit 300 is a communication apparatus or a communication module that communicates with another apparatus. The communication unit performs communication by a wireless system according to a communication destination such as a wireless telephone line, Wi-Fi or the like.

The communication controller 130 controls the communication unit 300 to cause the communication unit 300 to establish communication with a predetermined communication destination and cause the communication unit 300 to transmit, for example, information indicating that an event has occurred, a position in which the event has been detected, time when the event has been detected, and acceleration detected by the event detection unit 127 when the event has been detected to the predetermined communication destination. Further, the communication controller 130 controls the communication unit 300 to cause it to transmit the first event recording data and the second event recording data to the predetermined communication destination.

The recording apparatus 10A in the second embodiment transmits the first event recording data to another predetermined apparatus. The other apparatus to which the first event recording data is transmitted, which is, for example, a smartphone used by a driver or a passenger of the vehicle or an external server, a server of the insurance company with which the user makes a contract, a fire department, a rescue center or the like, is used to check whether or not an event has occurred and the state of the occurrence of the event.

The recording apparatus 10A in the second embodiment transmits the second event recording data to another predetermined apparatus. The other apparatus to which the second event recording data is transmitted, which is, for example, a smartphone used by a driver or a passenger of the vehicle or an external server, a server of the insurance company with which the user makes a contract, a fire department, a rescue center or the like, is used to quickly grasp the status of human or property damages that occur due to an event or to preserve evidence such as the behavior, the speech, and the action of a person involved in the event.

The recording apparatus 10A may transmit the first event recording data and the second event recording data to one destination or may transmit them to destinations different from each other. For example, the recording apparatus 10A may store the first event recording data in the recording unit 240, transmit the first event recording data to the server of the insurance company with which the user makes a contract, store the second event recording data in the recording unit 240, and transmit the second event recording data to a fire department or a rescue center.

Further, the recording apparatus 10A may transmit one of the first event recording data and the second event recording data to another predetermined apparatus. For example, the recording apparatus 10A may store the first event recording data to the recording unit 240 and transmit the first event recording data to the server of the insurance company with which the user makes a contract, and may store the second event recording data in the recording unit 240. For example, the recording apparatus 10A may store the first event recording data in the recording unit 240, store the second event recording data in the recording unit 240, and transmit the second event recording data to a fire department or a rescue center.

Next, a third embodiment of the present disclosure will be described. It is described in the first and second embodiments that the second event recording data is captured data that includes the video data and the voice data. The third embodiment is different from the first and second embodiments in that voice data that does not include video data is used as the second event recording data in the third embodiment. Since the components of the recording apparatus 10 according to the third embodiment are the same as those of the recording apparatus 10 according to the first embodiment, the descriptions of the components will be omitted. Further, the recording apparatus 10 according to the third embodiment may include the functions similar to those of the recording apparatus 10A according to the second embodiment, and may execute processing similar to that in the recording apparatus 10A according to the second embodiment.

It is possible, for example, that after an event such as an accident occurs and the first event recording data is stored, the situation of an accident or the like may be checked while reproducing the first event recording data using the recording apparatus 10. In this case, although it may be difficult to reproduce the first event data while capturing the situation of the accident or the like using the camera 210, it is possible that a speech useful for investigation of the accident may be recorded by storing the voice data.

Accordingly, the recording apparatus 10 according to the third embodiment stores the voice data that does not include the video data in the recording unit 240 as the second event recording data. Alternatively, the second event recording data formed of the voice data which does not include the video data is transmitted to another predetermined apparatus using the communication controller 130 and the communication unit 300.

The recording controller 123 continues to generate the second event recording data even in the period in which the reproduction of the first event recording data is being performed by the reproduction controller 124. Therefore, the recording apparatus 10 according to this embodiment is also able to store voice data in the period in which the first event recording data is being reproduced.

Figure 6:
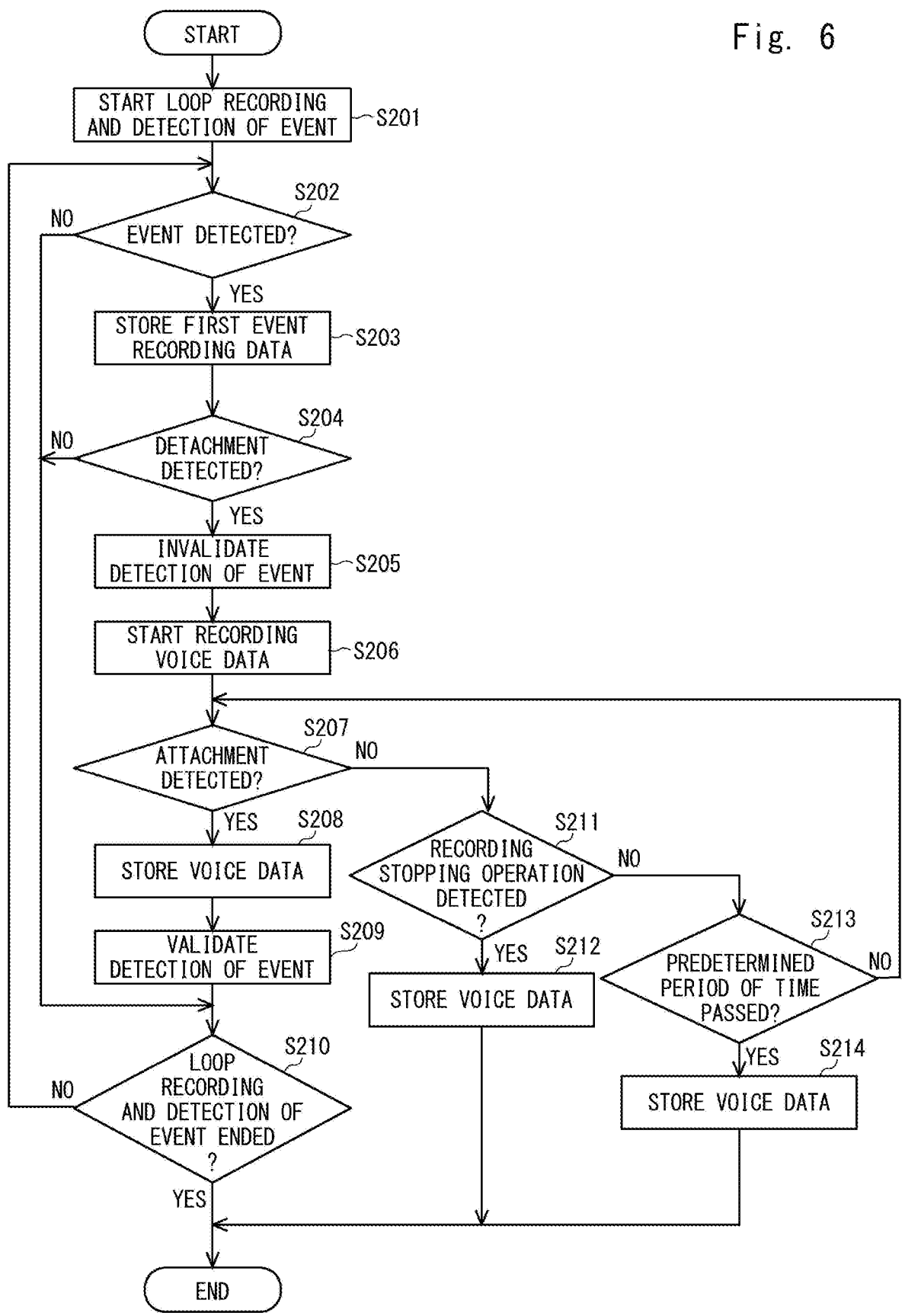
FIG. 6 is a flowchart showing a processing example of a recording apparatus according to a third embodiment of the present disclosure.

Referring to FIG. 6, processing in the third embodiment will be described. In the third embodiment, the period in which the second event recording data is stored is similar to that in the first embodiment. Therefore, since the processing from Step S201 to Step S205 of the processing shown in FIG. 6 is the same as the processing from Step S101 to S105 shown in FIG. 3, the descriptions thereof will be omitted. Further, since the processing shown in Steps S207, S209, S210, S211, and S213 is similar to the processing shown in Steps S107, S109, S110, S111, and S113 shown in FIG. 3, the descriptions thereof will be omitted.

When it is detected in Step S204 that the recording apparatus 10 has been detached from the vehicle (Step S204: Yes), the recording controller 123 starts recording the voice data as the second event recording at the same time as the processing shown in Step S205 or after the processing shown in Step S205 (Step S206).

Further, when it is detected in Step S207 that the recording apparatus 10 has been attached to the vehicle (Step S207: Yes), the recording controller 123 stops the second event recording and stores the second event recording data formed of the voice data generated here as write-protected data (Step S208). In a similar way, when it is determined in Step S211 that the recording stopping operation has been detected (Step S211: Yes), the recording controller 123 stops the second event recording and stores the second event recording data formed of the voice data generated here as write-protected data (Step S212). In a similar way, when it is determined in Step S213 that a predetermined period of time has passed (Step S213: Yes), the recording controller 123 stops the second event recording and stores the second event recording data formed of the voice data generated here as write-protected data (Step S214).

No matter when the reproduction of the first event recording data is started in the period in which the aforementioned second event recording data formed of the voice data is generated, the generation of the second event recording data formed of the voice data is continued. According to this processing, even in a case in which it is impossible to cause the camera 210 to be directed to the target to be captured after the recording apparatus 10 is detached from the vehicle, the voice data after the recording apparatus 10 is detached from the vehicle can be stored as the second event recording data. Further, since the voice data without including the video data is stored as the second event recording data, it is possible to store the second event recording data for a longer time than in the case in which the video data is stored.

Figure 7:
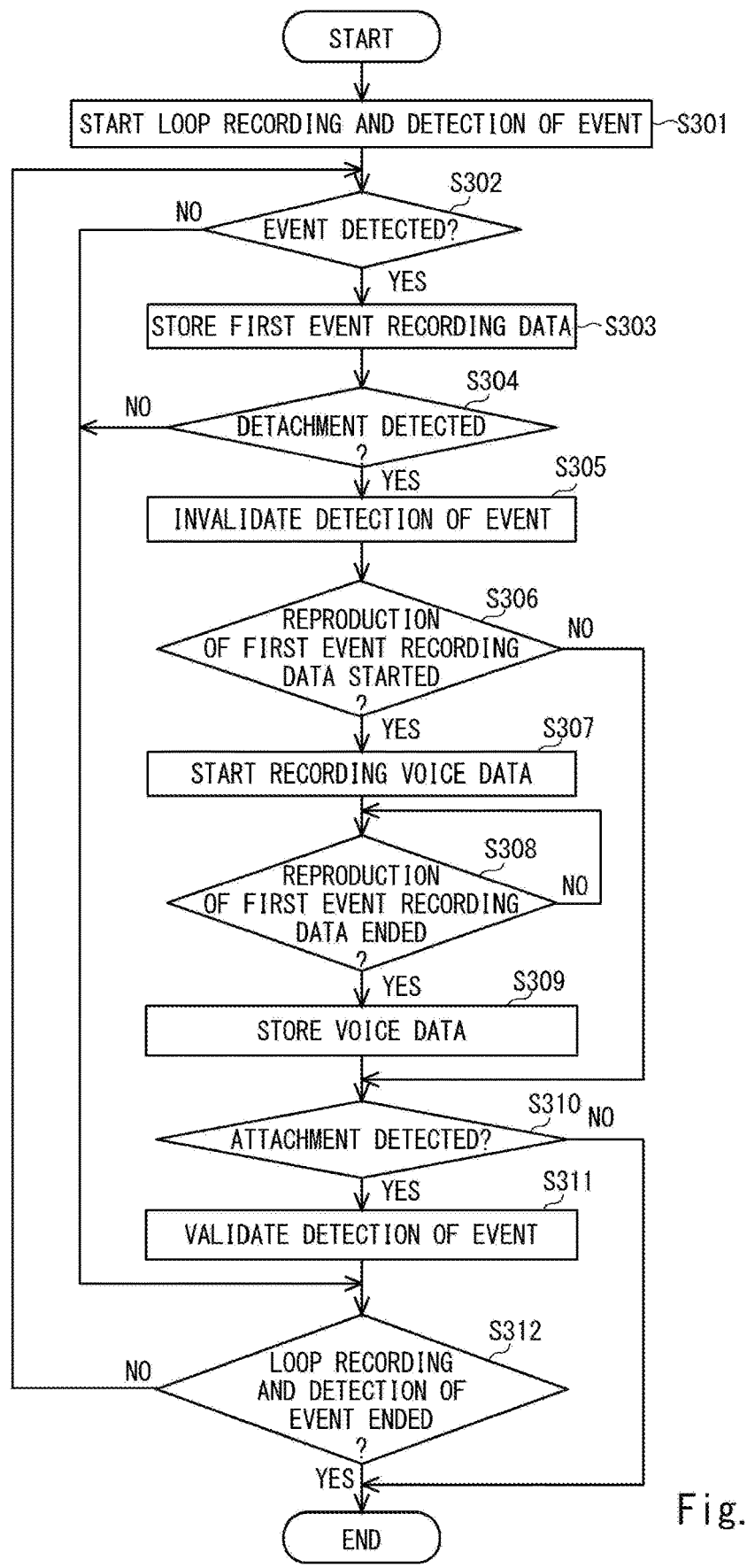
FIG. 7 is a flowchart showing another processing example of the recording apparatus according to the third embodiment of the present disclosure.

Referring next to FIG. 7, a modified example of the third embodiment will be described. In the modified example of the third embodiment, when the reproduction of the first event recording data is started, the second event recording data formed of the voice data in the period in which the reproduction of the first event recording data is performed is generated and stored.

Since the processing from Step S301 to Step S305 in FIG. 7 is the same as the processing from Step S201 to Step S205 in FIG. 6, the descriptions thereof will be omitted. Further, since the processing of Steps S311 and S312 in FIG. 7 is the same as the processing of Steps S209 and S210 in FIG. 6, the descriptions thereof will be omitted.

After the detection of the event is invalidated in Step S305, the operation controller 125 accepts the operation, whereby the recording controller 123 determines whether or not the reproduction controller 124 has started the reproduction of the first event recording data (Step S306). Further, in the processing in Step S306, it may be determined whether or not the reproduction of the first event recording data has been started within a predetermined period of time after the detection of the event has been invalidated. The predetermined period of time in this case is, for example, three minutes or five minutes.

The processing in Step S306 may be replaced by determination regarding whether or not the operation controller 125 has accepted the operation of performing the reproduction of the first event recording data. Further, in the processing in Step S306, it may be determined whether or not the operation of performing the reproduction of the first event recording data has been accepted within a predetermined period of time after the detection of the event has been invalidated. The predetermined period of time in this case is, for example, three minutes or five minutes.

It can be said that the first event recording data for which it is determined in Step S306 whether or not the reproduction has been started, which is the first event recording data stored in the processing shown in Step S303, is last saved first event recording data.

When it is determined in Step S306 that the reproduction of the first event recording data has been started (Step S306: Yes), the recording controller 123 starts recording the voice data as the second event recording (Step S307). When it is determined in Step S306 that the reproduction of the first event recording data has not yet started (Step S306: No), the process proceeds to Step S310.

After the recording of the voice data as the second event recording is started in Step S307, the operation controller 125 accepts the operation, whereby the recording controller 123 determines whether or not the reproduction of the first event recording data started by the reproduction controller 124 in Step S306 has been ended (Step S308). The processing in Step S308 may be replaced by determination regarding whether or not the operation controller 125 has accepted the operation of ending the reproduction of the first event recording data.

When it is determined in Step S308 that the reproduction of the first event recording data has ended (Step S308: Yes), the recording controller 123 stores the voice data started to be recorded in Step S307 in the recording unit 240 as the second event recording data (Step S309). When it is determined in Step S308 that the reproduction of the first event recording data has not ended (Step S308: No), the processing in Step S308 is executed again or it is waited until the reproduction of the first event recording data is ended.

When the second event recording data formed of the voice data is stored in Step S309, the recording controller 123 detects whether or not the recording apparatus 10 has been attached to the vehicle (Step S310). When it is detected in Step S310 that the recording apparatus 10 has been attached to the vehicle (Step S310: Yes), the recording controller 123 validates the detection of the event by the event detection unit 127 (Step S311). When it is not detected in Step S310 that the recording apparatus 10 has been attached to the vehicle (Step S310: No), this processing is ended. It may be determined to be No in Step S310 in a case in which it is not detected that the recording apparatus 10 has been attached to the vehicle within a predetermined period of time after the second event recording data formed of the voice data is stored in Step S309. The predetermined period of time in this case is, for example, three minutes or five minutes.

In the processing shown in FIG. 7, after it is determined in Step S308 that the reproduction of the first event recording data has been ended, the operation controller 125 may accept the operation of instructing the stop of the second event recording, whereby the voice data started to be recorded in Step S307 may be stored in the recording unit 240 as the second event recording data.

In this embodiment, the second event recording data formed of the voice data is generated and stored in conjunction with the reproduction of the first event recording data. Therefore, it is possible to appropriately store the conversation and the like in the period in which the first event recording data is reproduced and checked together with a person involved in an event or a person related to this event.

Note that the present disclosure is not limited to the above embodiments and may be changed as appropriate without departing from the spirit of the present disclosure. For example, processing of Steps S106 and S107 may be performed when the situation of an event such as an accident in which the user is not involved is recorded and when, for example, tourist spots and scenery are recorded depending on user's preference.

Further, the program(s) for causing a computer to execute the aforementioned processing can be stored using any type of non-transitory computer readable media and provided to the computer operating as a recording reproduction apparatus.

According to the above embodiments, it is possible to store situations after an event has been detected.

The above embodiments can be applied to various types of moving bodies.

What is claimed is:

1. A recording apparatus comprising:
a camera and a medium for recording data captured by the camera;
a captured data acquisition unit configured to acquire captured data captured by the camera that captures an image of an outside of a vehicle;
a processor coupled to a memory storing instructions, the processor being configured to:
 detect an attachment/detachment state of the recording apparatus with respect to the vehicle; and
 detect, by a sensor included in the recording apparatus, an event based on acceleration occurring in the vehicle, and when it is detected that the recording apparatus has been detached from the vehicle, not to output information indicating that the event has been detected when the acceleration corresponding to the event is detected, or stop the detection of the event;
a recording controller configured to:
 store, when the event is detected, captured data for a predetermined period of time due to the detected event as first event recording data that includes images, video, and sound;
 invalidate the detection of the event by the acceleration sensor included in the recording apparatus, when it is detected that the recording apparatus has been detached from the vehicle, the detection of the event after the detection of the detachment; and
 store captured voice data after the detection of the detachment as second event recording data;
a reproduction controller configured to reproduce first event recording data stored in the recording controller; and
a display unit that displays a video image of the first event recording data to be reproduced,
wherein the recording controller stores the captured voice data after the detection of the detachment as the second event recording data when the reproduction controller reproduces the first event recording data,
wherein, when the recording apparatus stops recording the video image of the first event recording data, the second event recording data starts recording voice data of the second event recording data, and
wherein the recording controller invalidates, when it is detected that the recording apparatus has been detached from the vehicle within a first period after the detection of the event, and stores the captured voice data after the detection of the detachment as the second event recording data.

2. The recording apparatus according to claim 1, further comprising a communication controller configured to control transmission and/or reception of data to/from a predetermined communication destination,
wherein the communication controller transmits, besides first event recording data, second event recording data stored after it is detected that the recording apparatus has been detached from the vehicle to a predetermined apparatus.

3. A recording method of a recording apparatus, the method comprising:
- recording on a medium data captured by a camera;
- acquiring captured data captured by the camera that captures an image of an outside of a vehicle;
- detecting, by a sensor included in the recording apparatus, an event based on acceleration occurring in the vehicle;
- detecting an attachment/detachment state of the recording apparatus with respect to the vehicle;
- storing, when an event has been detected in the detecting the event, captured data for a predetermined period of time due to the detected event as first event recording data that includes images, video, and sound, not outputting, when it is detected in the detecting the attachment/detachment state that the recording apparatus has been detached from the vehicle, information indicating that the event has been detected when the acceleration corresponding to the event is detected, or stopping the detection of the event after the detachment has been detected, and storing captured voice data after the detection of the detachment as second event recording data;
- invalidating the detection of the event by the acceleration sensor included in the recording apparatus, when it is detected that the recording apparatus has been detached from the vehicle, the detection of the event after the detection of the detachment;
- reproducing the stored first event recording data; and
- displaying a video image of the first event recording data to be reproduced,
- wherein, in the storing, the captured voice data after the detection of the detachment is stored as the second event recording data when the first event recording data is reproduced,
- wherein, when the recording apparatus stops recording the video image of the first event recording data, the second event recording data starts recording voice data of the second event recording data, and
- wherein the recording apparatus invalidates, when it is detected that the recording apparatus has been detached from the vehicle within a first period after the detection of the event, and stores the captured voice data after the detection of the detachment as the second event recording data.

4. A non-transitory computer-readable medium storing a program for causing a computer that operates as a recording apparatus to execute:
- recording on a medium data captured by a camera;
- acquiring captured data captured by the camera that captures an image of an outside of a vehicle;
- detecting, by a sensor included in the recording apparatus, an event based on acceleration occurring in the vehicle;
- detecting an attachment/detachment state of the recording apparatus with respect to the vehicle;
- storing, when an event has been detected in the detecting the event, captured data for a predetermined period of time due to the detected event as first event recording data that includes images, video, and sound, not outputting, when it is detected in the detecting the attachment/detachment state that the recording apparatus has been detached from the vehicle, information indicating that the event has been detected when the acceleration corresponding to the event is detected, or stopping the detection of the event after the detachment has been detected, and storing captured voice data after the detection of the detachment as second event recording data;
- invalidating the detection of the event by the acceleration sensor included in the recording apparatus, when it is detected that the recording apparatus has been detached from the vehicle, the detection of the event after the detection of the detachment;
- reproducing the stored first event recording data; and
- displaying a video image of the first event recording data to be reproduced,
- wherein, in the storing, the captured voice data after the detection of the detachment is stored as the second event recording data when the first event recording data is reproduced,
- wherein, when the recording apparatus stops recording the video image of the first event recording data, the second event recording data starts recording voice data of the second event recording data, and
- wherein the recording apparatus invalidates, when it is detected that the recording apparatus has been detached from the vehicle within a first period after the detection of the event, and stores the captured voice data after the detection of the detachment as the second event recording data.

* * * * *